US009421944B2

(12) United States Patent
Cuddihy et al.

(10) Patent No.: US 9,421,944 B2
(45) Date of Patent: Aug. 23, 2016

(54) REMOTE CONTROL SEATBELT HEIGHT ADJUSTER

(71) Applicant: Ford Global Technologies, LLC, Dearborn, MI (US)

(72) Inventors: Mark A. Cuddihy, New Boston, MI (US); Manoharprasad K. Rao, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 34 days.

(21) Appl. No.: 14/181,793

(22) Filed: Feb. 17, 2014

(65) Prior Publication Data
US 2015/0232061 A1  Aug. 20, 2015

(51) Int. Cl.
*B60R 22/20* (2006.01)
*B60N 2/00* (2006.01)
*B60R 22/48* (2006.01)
*B60R 22/24* (2006.01)
*B60R 16/037* (2006.01)
*B60R 22/18* (2006.01)

(52) U.S. Cl.
CPC .......... *B60R 22/201* (2013.01); *B60N 2/002* (2013.01); *B60R 16/037* (2013.01); *B60R 22/24* (2013.01); *B60R 22/48* (2013.01); *B60R 2022/1818* (2013.01); *B60R 2022/208* (2013.01); *B60R 2022/485* (2013.01)

(58) Field of Classification Search
CPC .. B60R 22/00; B60R 22/20; B60R 2022/208
USPC ......................................................... 701/45
See application file for complete search history.

(56) References Cited

U.S. PATENT DOCUMENTS

| 5,265,908 | A | 11/1993 | Verellen et al. |
|---|---|---|---|
| 5,566,978 | A | 10/1996 | Fleming et al. |
| 6,278,269 | B1* | 8/2001 | Vig et al. .................. 324/207.2 |
| 6,869,104 | B2* | 3/2005 | Monroe .................... 280/801.2 |
| 7,021,662 | B2 | 4/2006 | Hoffmann et al. |
| 7,164,117 | B2* | 1/2007 | Breed et al. .................. 250/221 |
| 7,461,866 | B2 | 12/2008 | Desmarais et al. |
| 8,523,229 | B1 | 9/2013 | Kohlndorfer |
| 2003/0209893 | A1* | 11/2003 | Breed et al. .................. 280/735 |
| 2004/0155450 | A1* | 8/2004 | Monroe .................... 280/801.2 |
| 2006/0208169 | A1* | 9/2006 | Breed et al. .................. 250/221 |
| 2008/0306656 | A1* | 12/2008 | Baumann .......... B60R 21/01552 |
| | | | 701/45 |
| 2009/0184708 | A1* | 7/2009 | Bujak et al. ............. 324/207.21 |
| 2010/0123302 | A1* | 5/2010 | Bujak et al. .................. 280/735 |
| 2013/0293223 | A1* | 11/2013 | Youngner ................ G01B 7/14 |
| | | | 324/207.12 |

FOREIGN PATENT DOCUMENTS

GB            2323017 B  *  4/2001

* cited by examiner

*Primary Examiner* — Jelani Smith
(74) *Attorney, Agent, or Firm* — Frank A. MacKenzie; Price Heneveld LLP

(57) ABSTRACT

An apparatus for positioning a vehicle restraint is provided herein having a track and a restraint support configured to slide along the track. A positioner is coupled to the restraint support and a motor, coupled to the positioner, is operable to adjust a position of the restraint support. A switch is in communication with the motor and the motor is operable to adjust the position of the restraint support in response an input to the switch. An apparatus for identifying the occupant and automatically positioning of a vehicle restraint is also provided.

19 Claims, 5 Drawing Sheets

REMOTE CONTROL SEATBELT HEIGHT ADJUSTER

FIELD OF THE INVENTION

The present invention generally relates to vehicle safety restraints, and more particularly relates to a system for height adjustment of a seatbelt.

BACKGROUND OF THE INVENTION

Automotive vehicles are generally equipped with a variety of safety equipment including vehicle safety restraints. Vehicle safety restraints in modern vehicles include shoulder harness restraints as well as waist restraints. Occupants may use vehicle safety restraints to provide protection from injuries in the event of a collision. Though vehicle safety restraints provide safety benefits, some occupants may consider them to be bothersome and, at times, uncomfortable. It is therefore desirable to provide a system operable to improve the comfort of a vehicle occupant as well as a convenience of an adjustment of a position of the vehicle safety restraint.

SUMMARY OF THE INVENTION

According to one aspect of the present invention, an apparatus for positioning a vehicle restraint comprises a track and a restraint support configured to slide along the track. A positioner is coupled to the restraint support, and an actuator coupled to the positioner is operable to adjust a position of the restraint support. A switch is in communication with the actuator, and the actuator is operable to adjust the position of the restraint support in response to an input to the switch.

According to another aspect of the present invention, a system for positioning a vehicle restraint comprises a track and a restraint support configured to slide along the track. A motor is coupled to a positioner, and the motor is operable to adjust a position of the restraint support along a longitudinal axis of the track via the positioner. A position monitoring device is operable to locate the restraint support along the longitudinal axis of the track.

In yet another aspect of the present invention, a method for adjusting a vehicle restraint comprises detecting a vehicle occupant and identifying a profile for the occupant in a controller in response to the occupant being detected. The controller may access data for the vehicle occupant including a position of a restraint support. The controller may then position the restraint support in response to the position.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
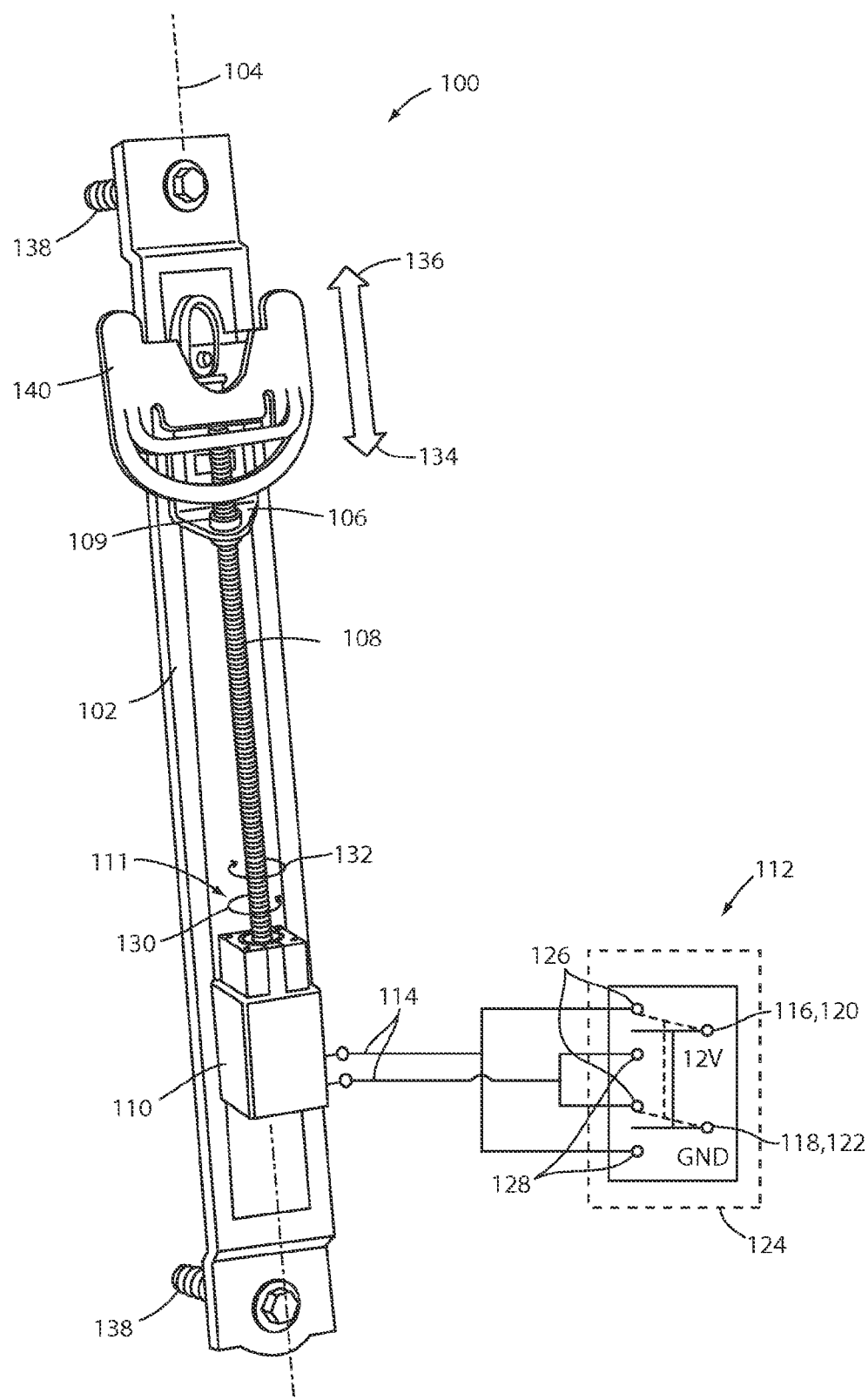
FIG. 1 is a schematic diagram of a system configured to adjust a seatbelt height.

Referring to FIG. 1, a system 100 is shown configured to remotely control and adjust a seatbelt height. The system 100 generally comprises a track 102 having a longitudinal axis 104. The track 102 is configured to slidably engage and guide a support 106 along the longitudinal axis 104 of the track 102. The support 106 may be operably connected to a positioner 108. In some implementations, the support may comprise an interface 109 configured to travel along the longitudinal axis 104 in response to a rotation of the positioner 108. The positioner 108 may comprise a leadscrew, pulley, rack and pinion, or any other mechanical system operable to adjust a linear position of the support 106. The interface 109 may comprise at least one thread configured to engage the positioner 108, for example a leadscrew nut.

The support 106 may travel along the longitudinal axis 104 in response to a rotation of the positioner 108. The positioner 108 may be coupled to a motor 110 proximate to a first end 111 of the positioner 108 such that a rotation of the motor 110 may cause the positioner 108 to rotate. The rotation of the positioner 108 may further cause the support 106 to travel along the longitudinal axis 104 of the track 102. The motor 110 may comprise any form of motor or actuator that may generate rotational motion in response to a driving current or signal. For example, the motor 110 may comprise a servo motor, a stepper motor, or any form of direct current (DC) motor. Though a DC motor is described herein, other mechanical devices and assemblies operable to generate linear motion along a guided path may be implemented to adjust the position of the support 106 within the spirit of the disclosure.

The motor 110 may be conductively connected to a driving circuit 112 by at least one electrical lead 114. The driving circuit 112 may comprise a first switch 116 and a second switch 118. The driving circuit 112 may further be connected to a power source comprising a voltage supply 120 and a common ground 122. The voltage supply may be provided from any power source, and in some implementations, may be provided from a DC power source in an automotive vehicle. In operation, the first switch 116 and the second switch 118 may define a bidirectional switch 124, for example a rocker switch. The bidirectional switch 124 may comprise a momentary contact type switch that may supply power to the motor 110 in response to an input. The input may comprise an input by a vehicle occupant to adjust a height of a vehicle safety restraint, for example a shoulder restraint of a seatbelt.

The bidirectional switch 124 may be operable to induce current in the motor 110 via the driving circuit 112 in a positive configuration 126 and a negative configuration 128. In response to the positive configuration 126, the motor may rotate in a first direction 130. In response to the negative configuration 128 the motor may rotate in a second direction 132. The rotation in the first direction 130 may induce a first motion 134 in the support 106 along the longitudinal axis 104. The rotation in the second direction 132 may induce a second motion 136 in the support 106 along the longitudinal axis 104. In operation, the driving circuit 112 may be operable to adjust a position of the support 106 in response to an input of the bidirectional switch 124.

The track 102 may be mounted to a vehicle pillar, for example a B-pillar or C-pillar of an automotive vehicle, by at least one fastener 138. Additionally, the support 106 may be mechanically connected to a D-ring 140. The D-ring 140 may be configured to support a vehicular safety restraint, for example a shoulder restraint of a seatbelt. In an exemplary implementation, the D-ring 140 may travel along the longitudinal axis 104 of the track 102 in response to an input to the bidirectional switch 124 to adjust a height of the D-ring. In this configuration, a height of a shoulder restraint of a seatbelt may be adjusted for an occupant via an input of the bidirectional switch 124.

The bidirectional switch 124 may be located in any location in an automotive vehicle and may preferably be located in a location easily accessible to a vehicle occupant. Though the bidirectional switch 124 is discussed herein, any other suitable switch or input may be applied to control the position of the support 106. The bidirectional switch 124 may be located on an occupant seat control panel, center console, door, instrument panel or any other location accessible to a vehicle occupant.

The bidirectional switch 124 or any other suitable control input may generally be located in front of a vehicle occupant. A control input may preferably be located in an automotive vehicle such that an occupant in a resting seated position may access the control input and conveniently adjust a position of a vehicle safety restraint. By incorporating a control input that may be conveniently accessible to a vehicle occupant, an effectiveness of a vehicle safety restraint may be improved by encouraging the vehicle occupant to wear and adjust the vehicle safety restraint to an appropriate position. Other benefits of this disclosure may be understood in light of the following implementations.

Figure 2A:
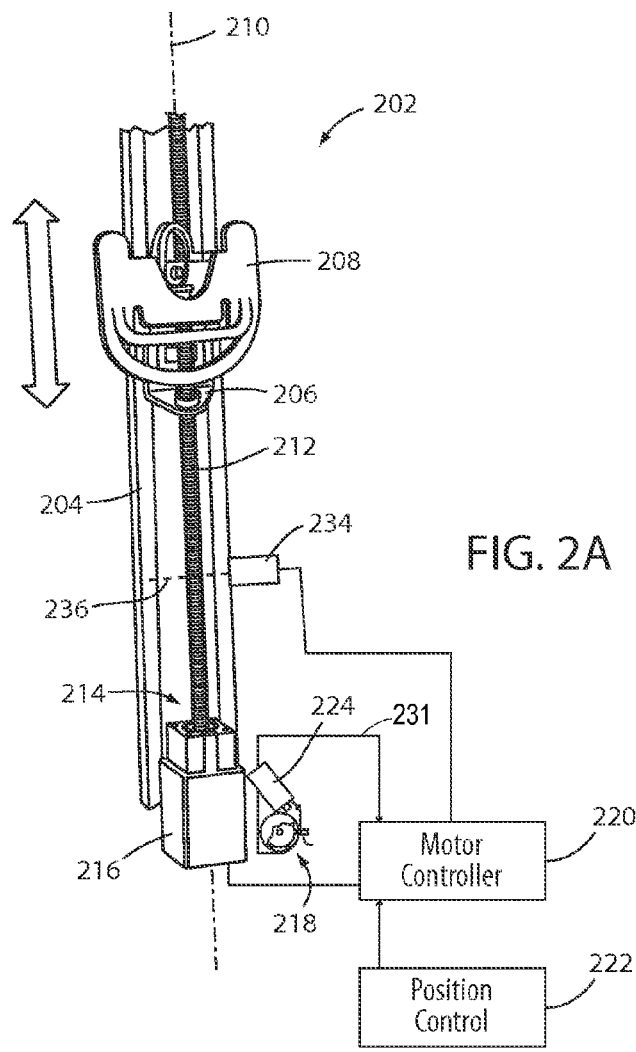
FIG. 2A is a schematic diagram of a system configured to monitor and control a position of a shoulder restraint.

Referring to FIG. 2A, a system 202 for detecting and controlling a position of a seatbelt height is shown. The system may comprise a track 204 configured to slidably engage a support 206. The support 206 may be connected to a D-ring 208. The D-ring 208 may be configured to support a shoulder harness of a seatbelt for an automotive vehicle. The support 206 may be positioned along a longitudinal axis 210 of the track 204 by a positioner 212. Coupled to a first end 214 of the positioner 212, a motor 216 may be connected and configured to rotate the positioner 212. In response to a rotation of the positioner 212, a position of the support 206 may be adjusted along the longitudinal axis 210 of the track 204.

Figure 2B:
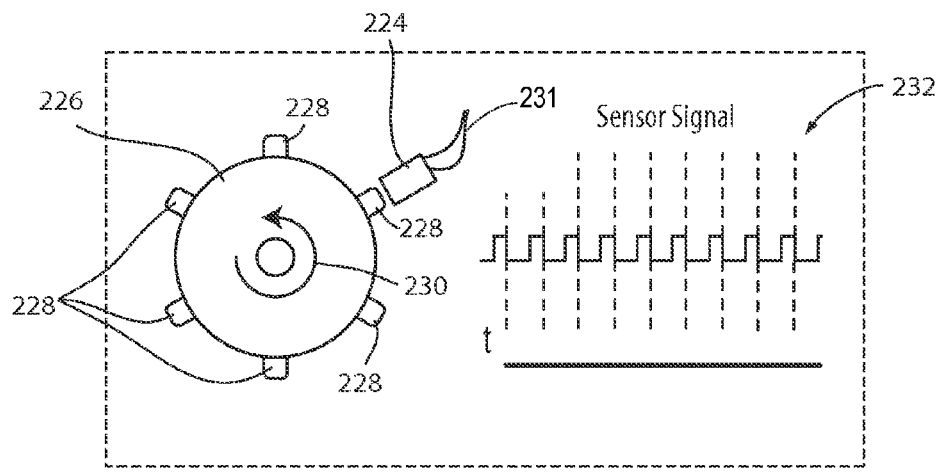
FIG. 2B is a detailed diagram of a positioning device operable to monitor a position of a shoulder restraint-based on a rotation of the motor.

Referring now to FIGS. 2A and 2B, the motor 216 may comprise a positioning device 218 in communication with a motor controller 220. The motor controller 220 may further be in communication with a position control 222. The position control 222 may comprise a bidirectional switch or any other suitable control input as previously discussed in reference to FIG. 1. The positioning device 218 may be operable to detect a rotation of the motor 216. In some implementations, the positioning device may comprise a sensor 224 operable to detect a rotation of the motor 216. The rotation of the motor 216 may be monitored and detected by the sensor 224 and communicated to the motor controller 220. Examples of the types of devices that may be used for sensor 224 include a rotary variable resistor and a Hall Effect sensor.

In some implementations, a gear 226 may be coupled to the motor 216 and configured to rotate in response to a rotation of the motor 216. The sensor 224 may be positioned in the positioning device 218 such that the sensor 224 may detect at least one tooth 228 of the gear 226 in response to a rotation 230 of the gear 226. In response to the detection of the at least one tooth 228 of the gear 226, the sensor may output a signal to the motor controller 220. The signal from the sensor 224 may be communicated to the motor controller 220 from a sensor output 231, for example the sensor signal 232. In operation, the sensor 224 may communicate a change in position of the support 206 by monitoring and detecting the rotation of the motor 216.

Similar to the implementation introduced in reference to FIG. 1, the position control 222 may be implemented as a bidirectional switch or any other input configured to communicate a directional control to the motor controller 220. The position control 222 may be located such that a vehicle passenger may access the position control 222 from a resting seated position in an automotive vehicle. In some implementations, the motor controller 220 may monitor and store a location of the support 206. The motor controller may determine the location of the support 206 along the longitudinal axis 210 of the track 204 by the sensor signal 232 communicated from the sensor output 231.

In some implementations, a location of the support 206 may be monitored based on a relative location of the support 206 in relation to a rotation of the gear 226. As previously discussed, the support 206 may be located in response to a rotation of the positioner 212. The rotation of the positioner 212 may further be controlled in response to a rotation of the motor 216. The relative location of the support 206 may vary over time due to a positioning error. Such a positioning error may result from small positioning errors that may accumulate due to a limited resolution of the positioning device 218. Positioning errors may also accumulate due to a limited positional detection of the motor controller 220 or an error in operation of the motor controller 220.

In order to ensure accurate operation over time, a calibration sensor 234 may be integrated with the system 202. The calibration sensor 234 ensures accurate reporting from the position controller by adjusting for any slippage over time in 206, 212, and 226. The calibration sensor 234 may be in communication with the motor controller 220 and operable to locate the support 206 at calibration position 236 along the longitudinal axis 210 of the track 204. The motor controller 220 may be configured to complete a calibration routine to update a stored location of the support 206 along the track 204. The calibration routine may comprise the motor controller 220 causing the motor 216 to rotate further causing the support 206 to travel to a calibration position 236 of the calibration sensor 234. Upon detection of the support 206, the calibration sensor 234 may communicate a presence of the support 206 to the motor controller 220. From the calibration position 236, the motor controller 220 may update a position of the support 206 to correct for any positioning errors. Though the calibration position is shown in a particular location in FIG. 2, the location may vary based on a particular application or calibration routine.

The calibration routine of the system 202 may be updated at various times during system 202 operation. In some implementations, the calibration routine may be initiated in response to an event, for example the detection of a vehicle occupant. The calibration routine may also be activated in response to a system check initiated by a control system of an automotive vehicle. The system check may be implemented at a scheduled time, for example a service visit, an occupant exiting the vehicle, an occupant entering a vehicle, etc. Various information regarding one or more system events that may initiate the calibration routine may be detected by additional systems in the automotive vehicle and communicated to the motor controller 220.

The system 202 and other systems operable to position a vehicle safety restraint discussed herein may provide for a variety of additional functions. For example, a vehicle occupant may be detected based on one or more identifying features of the vehicle occupant. In response to the one or more identifying features of the vehicle occupant, the system 202 may be operable to adjust and locate a position of a vehicle seatbelt restraint by adjusting a location of the support 206. Some examples of identifying features may comprise at least a portion of a face of an occupant, a ratio of one or more characteristics of the occupant, a profile of an occupant, any form of recognition process determined from one or more images, etc. The occupant may also be identified by other means, such as, voice recognition and personal digital connectivity device recognition (e.g. a wireless device, a cellular phone, a PDA, etc.). The system 202 and other systems disclosed herein may provide for additional functionality and comfort for vehicle occupants by detecting and automatically positioning a height of at least one shoulder restraint in an automotive vehicle by implementing the systems and methods disclosed herein.

Figure 3A:
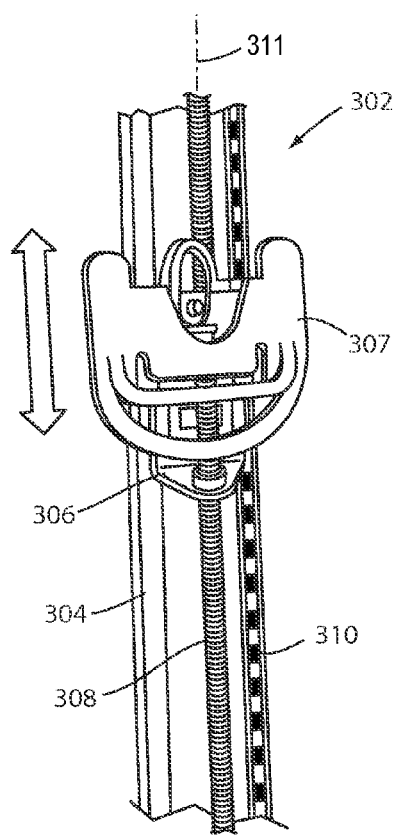
FIG. 3A is a schematic diagram of a system configured to monitor and control a position of a shoulder restraint-based on a magnetic array.

Referring to FIG. 3A, a system 302 for detecting and controlling a position of a seatbelt height is shown. For clarity, some components are omitted from FIG. 3A and components similar to those described in reference to FIG. 1 and FIG. 2 may be similarly applied as in the aforementioned implementations. The system 302 may generally comprise a track 304 and a support 306 configured to slidably engage the track 304. A D-ring 307 may be connected to the support 306 and configured to engage a vehicular safety restraint, for example a shoulder restraint of a seatbelt. Similar to the previous implementations, a positioner 308 may be coupled to a motor proximate to a first end and operable to locate the support 306 in response to a rotation of the motor.

Figure 3B:
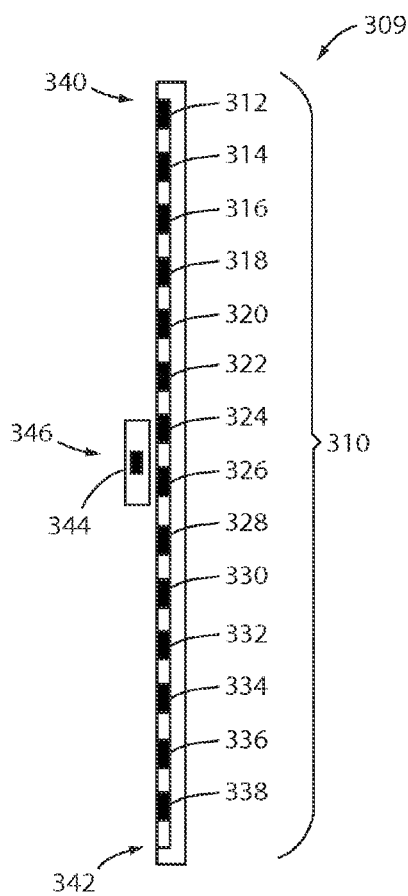
FIG. 3B is a detailed diagram of a positioning device operable to measure a position from a magnetic array.

In some implementations, a detection device 309 may comprise a magnetic array 310. The magnetic array 310 may extend along a longitudinal axis 311 of the track 304. A detail view of the magnetic array 310 is shown in FIG. 3B. The magnetic array 310 is composed of a plurality of magnets 312, 314, 316, 318, 320, 322, 324, 326, 328, 330, 334, 336, and 338. The magnet 312 may be located proximate to a top limit of travel of the support 306 and the magnet 338 may be located proximate to a bottom limit of travel of the support 306 along the track 304. The arrangement of the magnets 312-338 may provide for a first pole 340 being formed proximate to the top limit of travel and a second pole 342 being formed proximate to the bottom limit of travel. A sensor 344 may be connected to or integrated in the support 306 such that a travel of the support may be detected by the sensor 344.

The sensor 344 may comprise a magneto-resistive sensor. The sensor 344 may be positioned proximate to the support 306 and the magnetic array 310 such that the sensor 344 may be maintained in proximity to the magnetic array during a travel of the positioner along the longitudinal axis 311 of the track 304. The sensor 344 may measure an angle of a polarity of a magnetic field extending along the magnetic array 310. For example, a direction of polarity of the magnetic field measured by the sensor 344 proximate to the first pole 340 may be an acute angle directed substantially toward the first pole 340. The direction of polarity measured by the sensor 344 proximate to a middle portion 346 of the magnetic array 310 may be an angle perpendicular to the magnetic array 310. Finally, a direction of polarity of the magnetic field measured by the sensor 344 proximate to the second pole 342 of the magnetic array 310 may be an acute angle directed toward the second pole 342. In this way, the sensor 344 may detect a location of the sensor 344 and similarly the support 306 to measure a position of the D-ring 307 along the track 304.

Figure 3C:
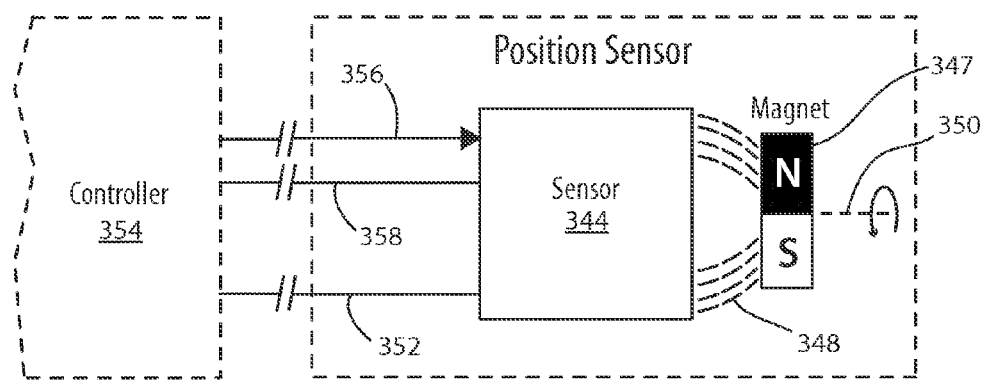
FIG. 3C is a detailed diagram of a sensor operable to detect a direction of a magnetic field of a magnetic array.
Figure 5:
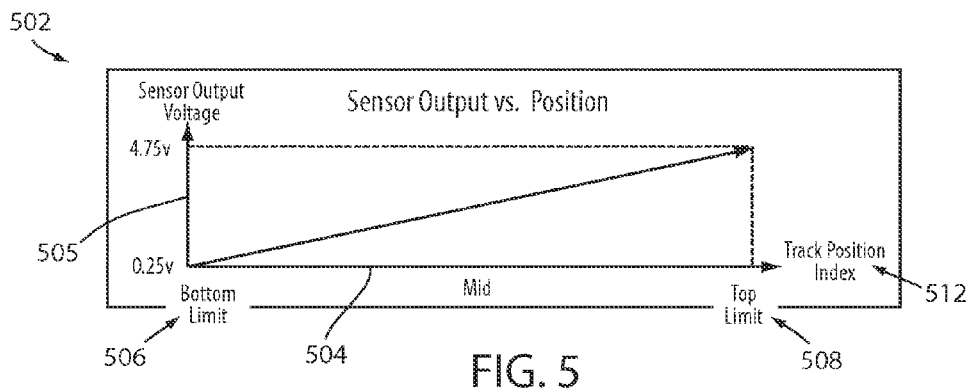
FIG. 5 is a sample output from a sensor reporting a position from an inductive sensor.

Referring to FIG. 3C, an electrical block diagram of the sensor 344 is shown. The sensor 344 may be configured to measure an angle of polarity of the magnetic array 310 as previously discussed. The sensor 344 may be operable to detect changes in a direction of polarity of a portion 347 of the magnetic array 310. That is, the sensor 344 may be operable to measure a direction of the polarity of a magnetic field 348 in response to an orientation 350 of the magnetic field 348. The sensor 344 may output a signal via a signal output 352 in communication with a controller 354. The controller may be configured to supply electrical power connection 356 and a common ground connection 358 to the sensor 344. In operation, the sensor 344 may output a voltage that varies linearly in response to a location of the sensor 344 between the first pole 340 and the second pole 342. An example of a sample output signal from the sensor 344 is shown in FIG. 5.

Figure 4:
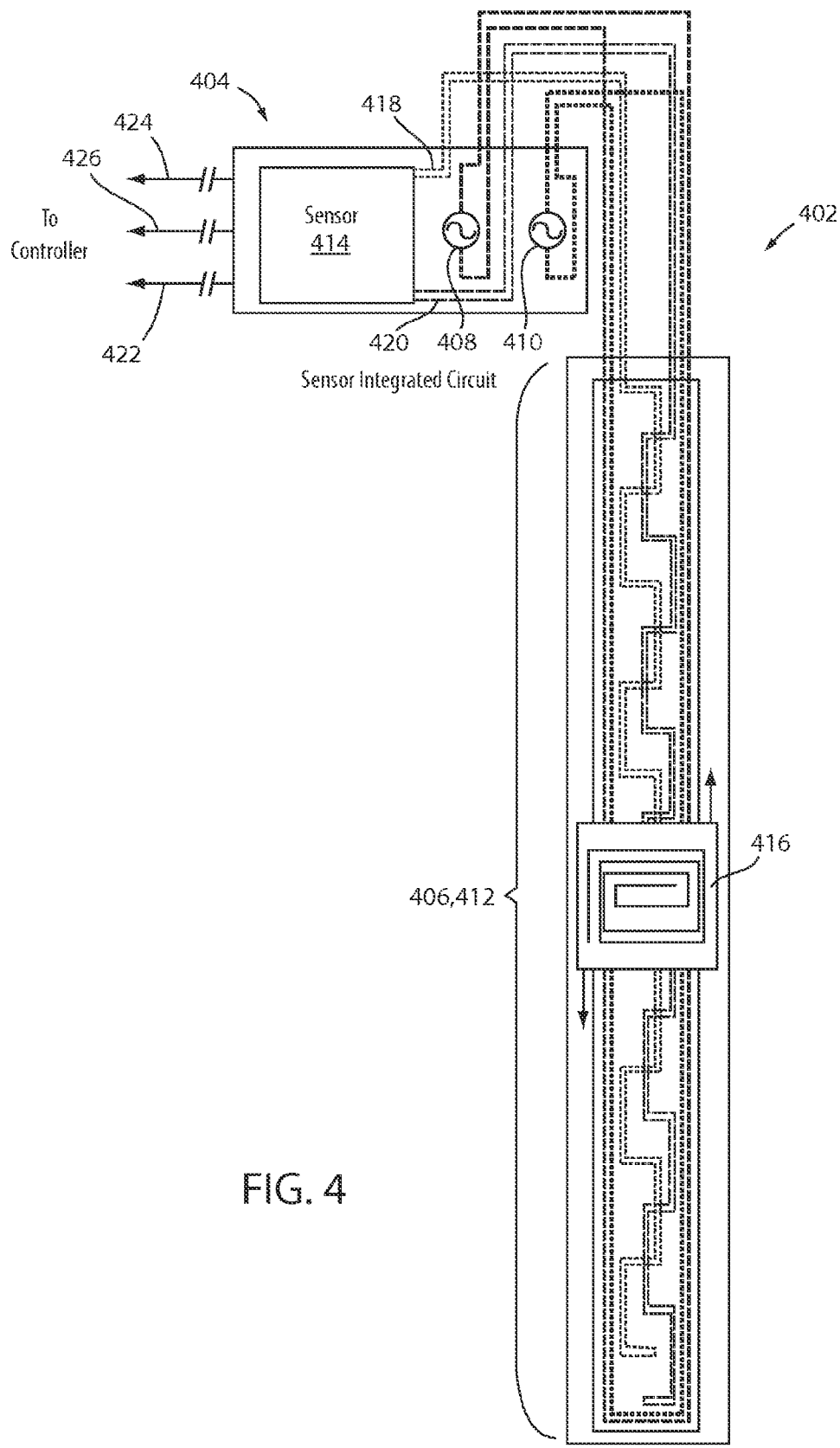
FIG. 4 is a detailed diagram of a sensor system operable to measure a position from an inductive sensor with a loop target.

Referring to FIG. 4, a detection device 402 configured for detecting a position of a seatbelt height is shown. The detection device 402 may be implemented similar to the detection device 309 discussed previously in reference to FIG. 3. The detection device 402 may generally comprise a control circuit 404 and a coil array 406. The control circuit 404 may be in communication with a first coil transmitter 408 and a second coil transmitter 410. The control circuit 404 may be operable to induce a first alternating current (AC) current in the first coil transmitter 408 and a second AC current in the second coil transmitter 410. An electromagnetic field of the coil array 406 may be generated in response to the AC excitations induced in the first coil transmitter 408 and the second coil transmitter 410 along the length of a coil array circuit 412.

The control circuit 404 and the coil array circuit 412 may be manufactured in the form of one or more printed circuit boards. The control circuit 404 may comprise a sensor 414 operable to measure a phase of the first AC current and the second AC current. A target coil 416 may be configured to slide along a longitudinal axis of the coil array circuit 412 and may be connected to or integrated into a support, similar to the support 306. As the support and the target coil 416 travel along the longitudinal axis of the coil array circuit 412, the electro-magnetic fields of the first AC current and the second AC current may be inductively coupled to a first receiver coil 418 and a second receiver coil 420.

The first receiver coil 418 and the second receiver coil 420 may be operable to receive and communicate a phase change corresponding to the phase of the first AC signal and the phase of the second AC signal to the sensor 414. As the target coil 416 is moved along the longitudinal axis of the coil array circuit 412 the phase communicated to the sensor 414 may vary. The sensor 414 may measure the changes in the phase of the first AC signal and the phase of the second AC signal by monitoring signals delivered from the first receiver coil 418 and the second receiver coil 420. In response to the signals communicated, the sensor 414 may output a signal via a signal output 422 identifying the position of the target coil 416 and the support. The location of the support may then be applied to locate a position of a D-ring and a seatbelt shoulder strap in accordance with the disclosure.

The sensor 414 may output a signal via the signal output 422 in communication with a controller. The controller may be configured to supply electrical power through a power connection 424 and a common ground connection 426. In operation, the sensor 414 may output a voltage that varies linearly in response to a location of the target coil 416 along the longitudinal axis of the coil array circuit 412. A sample output signal from the sensor 414 is shown in FIG. 5.

Referring to FIG. 5, a graphical representation 502 of a position of a support for a shoulder harness of a seatbelt is shown in relation to an output voltage of a signal output from a sensor. FIG. 5 may demonstrate an example of a signal output from sensor 344 or sensor 414 as discussed previously. An X-axis 504 may demonstrate a height position of a support for a shoulder restraint in a vehicle. A Y-axis 505 may demonstrate a sensor output voltage. The travel of the support may correspond to a low voltage output proximate to a bottom limit of travel 506 of the support and a high voltage signal proximate to a top limit of travel 508 of the support. A linear relationship is demonstrated for a sensor voltage output in relation to a position of the support relative to a track. In this depiction, the voltage ranges from 0.25 volts to 4.75 volts. However, a sensor output signal may vary in relationship and voltage within the spirit of the disclosure.

Figure 6:
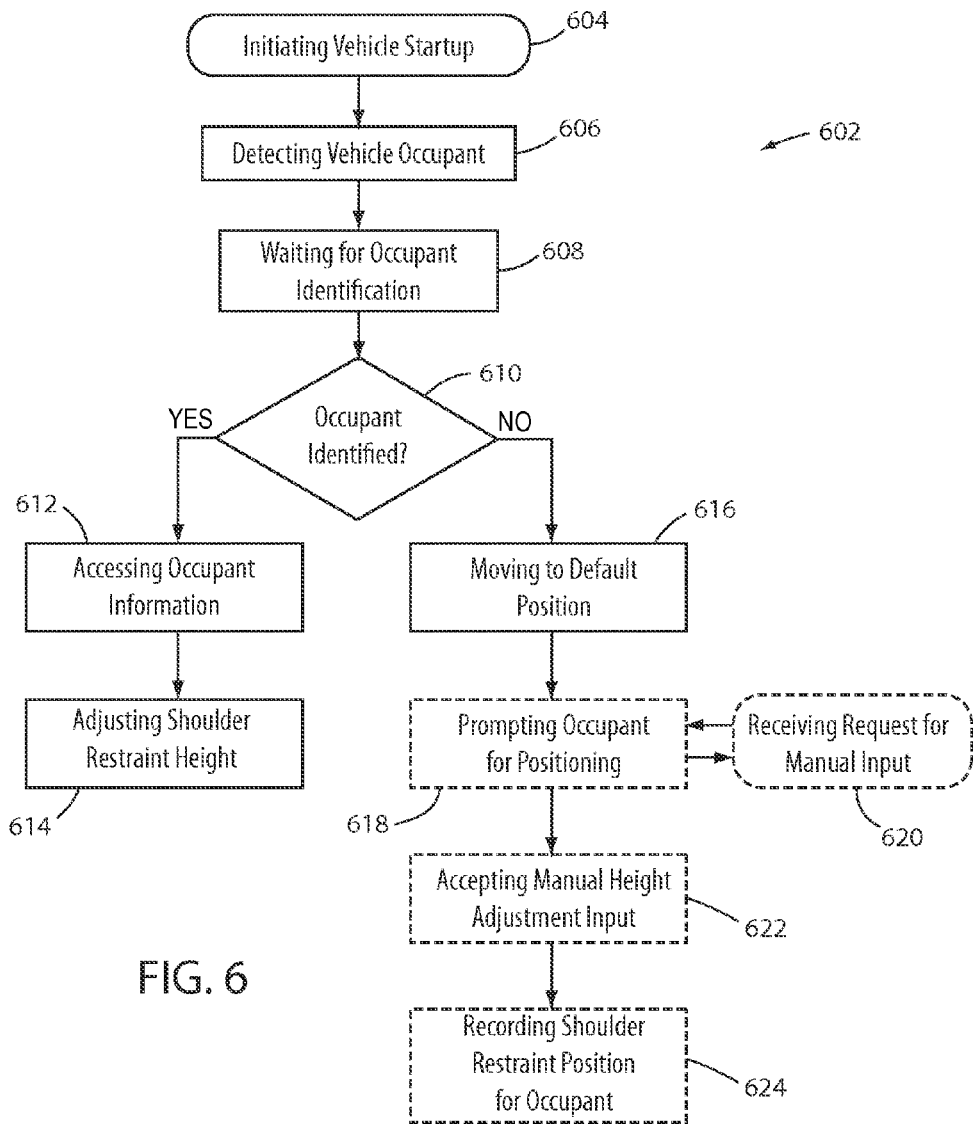
FIG. 6 is a block diagram of a method for identifying an occupant and adjusting a seatbelt height in accordance with the disclosure.

Referring to FIG. 6, a method 602 for adjusting a position of a vehicle safety restraint is shown in accordance with the disclosure. The method 602 may begin upon initiating a vehicle startup 604. The vehicle startup may be initiated in response to a vehicle ignition, a door opening, an occupant detection, or any other event detected by a control system of an automotive vehicle. Following the vehicle startup, the method 602 may continue by detecting a vehicle occupant 606. A vehicle occupant may be detected by a variety of methods. A vehicle occupant may be detected by an occupant proximity or identification characteristic. For example, an identity of a vehicle occupant may be determined by an optical recognition process of an interior camera, a signal sensed from a key fob, a signal corresponding to an RFID tag, a user input, or any other sensory means.

An optical recognition process may relate to one or more optical sensors located in a vehicle and mounted such that a field of view of the one or more optical sensors may capture at least one image of at least a portion of a vehicle occupant. Detecting the vehicle occupant may comprise searching the at least one image for at least one feature identifying the occupant. For example, an optical sensor or optical vision system may capture an image of at least a portion of a face of an occupant and determine an identity or at least one identifying feature of the occupant based on a facial recognition algorithm. The facial recognition algorithm may be processed by one or more processors in communication with the one or more optical sensors. In this way, an identity of a vehicle occupant may be determined to provide one or more personalized settings for the vehicle occupant.

In some instances, an occupant may not be identified immediately. To ensure an occupant is identified the method 602 may wait for an occupant identification 608. In response to an occupant being identified 610, the method 602 may continue by accessing occupant information 612. The occupant information may be stored in a memory operable to recall at least one recorded setting. The recorded setting may comprise seatbelt height position and other information associated with the occupant. The memory may be integrated in one or more control systems of an automotive vehicle. In some implementations, the recorded setting may be stored in memory of a motor controller of a system for detecting and controlling a position of a seatbelt height. In response to a successful attempt to access the recorded setting, the method may continue by adjusting a shoulder restraint height according to the recorded setting for the occupant 614.

If an occupant is not identified in step 610, a position of a seatbelt height may be adjusted to a default position 616. In some implementations, one or more control systems of the automotive vehicle may comprise a user interface. The user interface may prompt the occupant for positioning of a height of a shoulder restraint 618. The user interface may similarly prompt an occupant to position a height of the shoulder restraint in response to a request for a manual input of a height of the shoulder restraint 620. A manual input may be input by an occupant by toggling a position control, for example the position control 222. Upon receiving an input from the occupant in the form of a manual height adjustment, the method 602 may continue by acknowledging and accepting the manual height adjustment input 622. Finally, the height adjustment position for the specific occupant, identified in step 610, may be recorded to the memory as the shoulder restraint position for the occupant 624. In some implementations, this may be a method for registering an occupant, and an occupant preference for a restraint position when the occupant is not initially identified by the system in step 610.

The various implementations described herein may provide for a variety of benefits. In general, a system as disclosed may provide for added safety and comfort by enabling a vehicle occupant to easily adjust a height of a vehicle safety restraint. In some implementations, a system may provide for at least one recorded setting to be recalled in response to an input from an occupant. The at least one recorded setting may provide for a vehicle safety restraint to be stored and recalled for a particular occupant. In yet another implementation, the systems and methods disclosed herein may provide for a vehicle safety restraint system that is operable to identify an occupant and automatically adjust the vehicle safety restraint based on one or more settings determined or previously programmed for the occupant. The systems and methods setout herein may provide for additional occupant comfort and improved safety by allowing occupants to properly adjust at least one safety restraint in a motor vehicle.

The various implementations described herein may serve as exemplary implementations and may be combined within the spirit of the invention. The systems and methods discussed herein may provide a variety of advantages related to positioning a vehicle safety restraint. The specific implementations discussed herein should not be considered limiting. It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. An apparatus for positioning a vehicle seatbelt support comprising:
  a track;

a support configured to slide along the track;
a positioner coupled to the support;
an actuator coupled to the positioner and operable to adjust a position of the support;
an input in communication with the actuator, wherein the actuator is operable to adjust the position of the support in response to the input;
a position sensor configured to detect a rotational motion of the actuator and output positional data;
a calibration sensor configured to detect a specific position of the positioner along the track; and
a controller operable to:
determine a relative location of the support along the track based on the positional data; and
update the positional data for the positioner in response to the detection of the specific position.

2. The apparatus according to claim 1, wherein the controller is operable to record a plurality of positions of the positioner.

3. The apparatus according to claim 2, further comprising an occupant identifier, wherein the controller is operable to recall each of the plurality of positions in response to an occupant identification.

4. The apparatus according to claim 3, wherein the occupant identification is communicated to the controller via an occupant identification device.

5. The apparatus according to claim 4, wherein the occupant identification device comprises an optical vision system configured to distinguish at least one of a characteristic of the occupant.

6. The apparatus according to claim 1, wherein the controller is configured to receive a calibration signal from the calibration sensor in response to the support being located at the specific position proximate the calibration sensor.

7. The apparatus according to claim 1, wherein the calibration sensor corresponds to a presence sensor configured to detect the presence of the support at the specific position.

8. A system for positioning a vehicle seatbelt support comprising:
a track;
a support configured to slide along the track;
an actuator coupled to a positioner, the actuator operable to adjust a position of the support along a longitudinal axis of the track via the positioner;
a position sensor operable to detect a rotational motion of the actuator and output a relative positon of the positioner;
a calibration sensor operable to detect a specific position of the support along the longitudinal axis; and
a controller in communication with the position sensor and the calibration sensor, the controller operable to receive the relative position from the position sensor to locate the support along the track.

9. The system according to claim 8, wherein the position sensor is operable to detect a proximity of a plurality of gear teeth in rotational communication with the actuator.

10. The system according to claim 8, further comprising electro-magnetic coil transmitters connected to electrical coils along the longitudinal axis of the track.

11. The system according to claim 10, wherein the electromagnetic coil transmitters and coils further comprise an inductive target coil to sense the position of the support along the longitudinal axis of the track.

12. The system according to claim 11, wherein the inductive target coil is connected to the support.

13. The system according to claim 8, wherein the controller is further operable to: update the relative position of the of the positioner in response to receiving a calibration signal from the calibration sensor identifying the support located at the specific position.

14. The system according to claim 13, wherein the controller is further operable to:
correct for a positioning error due the position sensor by updating the relative position of the support based on the calibration signal.

15. A method for adjusting a vehicle seatbelt support comprising:
detecting a vehicle occupant;
capturing data corresponding to at least one characteristic of the occupant;
attempting to identify a profile for the occupant based on the characteristic in a controller in response to the occupant;
in response to identifying the profile, accessing data for the profile from the controller, the data comprising a position of a restraint support;
in response to failing to identify the profile, prompting the occupant for the position of the restraint support; and
positioning the support according to the position, wherein the positioning comprises:
locating the position based on a reltive position of the restraint support, and
updating the relative position in response to receiving a calibration signal corresponding to an indication of the restraint support being identified at a calibration position.

16. The method according to claim 15, further comprising receiving an input from the occupant to adjust the position of the restraint support.

17. The method according to claim 16, further comprising recording the position of the restraint support to the controller.

18. The method according to claim 15, wherein identifying the vehicle occupant comprises searching for an occupant identification signal.

19. The method according to claim 15, wherein identifying the vehicle occupant comprises searching an optical image for at least one feature identifying the occupant.

* * * * *